UNITED STATES PATENT OFFICE.

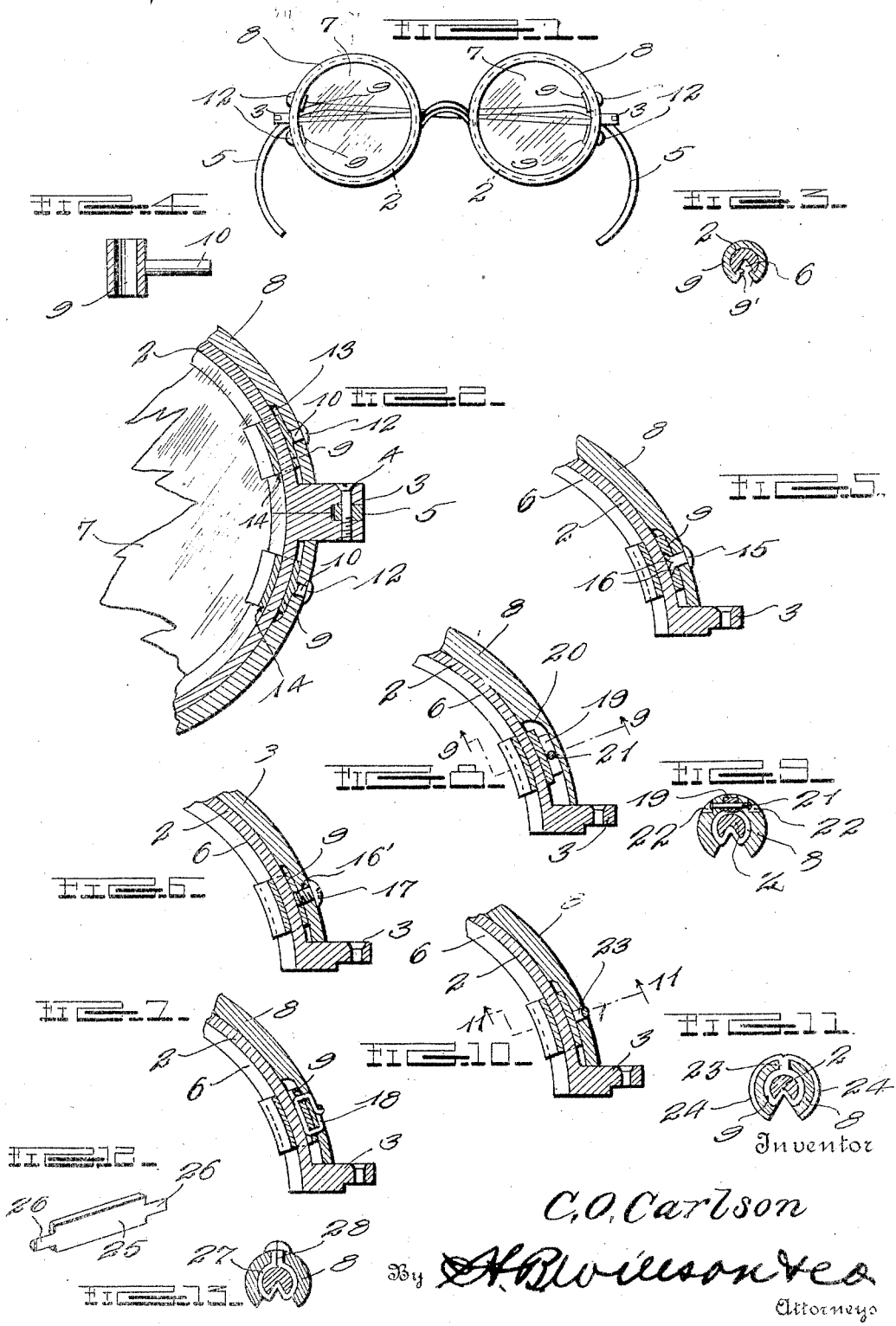

CHARLES O. CARLSON, OF PROVIDENCE, RHODE ISLAND.

SHELL-RIM FASTENER FOR EYEGLASSES.

1,367,237.  Specification of Letters Patent.  Patented Feb. 1, 1921.

Application filed July 26, 1920. Serial No. 398,920.

*To all whom it may concern:*

Be it known that I, CHARLES O. CARLSON, a citizen of the United States, residing at Providence, in the county of Providence and State of Rhode Island, have invented certain new and useful Improvements in Shell-Rim Fasteners for Eyeglasses; and I do declare the following to be a full, clear, and exact description of the invention, such as will enable others skilled in the art to which it appertains to make and use the same.

This invention relates to an improved eyeglass construction and has particular reference to an improved fastener by means of which the shell rims of a pair of eye-glasses may be securely held in place without the metal lens holding rims.

One object of the invention is to so construct the fasteners that the shell rims may be securely held in place and prevented from moving out of engagement with the metal lens holding rims.

Another object of the invention is to so construct this fastener that in addition to holding the shell rims in place, the fastener may also serve as means for preventing the lenses from having rotary movement in the metal lens holding rims.

Another object of the invention is to so construct this fastener that it may be mounted upon the metal lens holding rims and have firm engagement with the shell rims.

Another object of the invention is to so construct the fastener that it will be cheap to produce and be easy to put in place.

This invention is illustrated in the accompanying drawings, wherein:

Figure 1 is a view showing a pair of eyeglasses provided with shell rims held in place by means of the improved fasteners, Fig. 2 is an enlarged fragmentary sectional view of the eye-glasses shown in Fig. 1, Fig. 3 is a sectional view taken through the lens rim and fastener, Fig. 4 is a sectional view through the fastener, Fig. 5 is a fragmentary sectional view showing a modified means for connecting the shell rim with the sleeve of the fastener, Fig. 6 is a view similar to Fig. 5 showing a modified construction of fastener, Fig. 7 is a view similar to Figs. 5 and 6 showing a wire used for connecting the sleeve with the shell rims, Fig. 8 is a view similar to Figs. 5 and 6 showing the modified construction of sleeve and fastener, Fig. 9 is a sectional view taken along the line 9—9 of Fig. 8, Fig. 10 is a view similar to Fig. 8 showing a modified fastener, and Fig. 11 is a sectional view taken along the line 11—11 of Fig. 10.

Fig. 12 is a perspective view showing the blank for forming a modified fastener, Fig. 13 is a view similar to Fig. 3 showing the fastener of Fig. 12 in use.

The glasses are provided with the usual bridge or nose-piece 1 which connects the metal rims 2 which rims will have the usual construction and will be provided with ears 3 through which will pass a fastener screw 4 to releasably connect the ears and serve as means for mounting the bows 5 for holding the glasses in place. The metal rim 2 is provided with a groove 6 as shown in Fig. 3 to receive the edge portion of the lens 7 and will thus obtain a firm grip upon the lens so that the lens will be held in place. While this will serve to hold the lens in place, a lens will often be slightly loose in the frame and may rotate. In order to prevent rotation of the lens and to further provide means for holding a shell rim 8 in place, the improved fastener which will now be described has been provided.

In the accompanying illustration, fasteners having modified constructions have been shown. In the form shown in Figs. 2, 3 and 4, the device is provided with a sleeve 9 which may be split longitudinally and is placed about the rim 2 and bent to provide flanges 9' which extend into the groove 6 as shown in Fig. 3 thus securely connecting the sleeve with the rim 2. A pin 10 extends from the sleeve 9 and will pass through an opening formed in the shell rim. After the sleeve has been put in place and the stem passed through the opening of the shell rim, the stem will be cut off and riveted thus providing a head 12. The end portion of the shell rim 8 is cut from its inner face to provide a pocket 13 into which the sleeve 9 fits and the lens 7 will be cut to provide a seat 14 for the sleeve of each fastener as shown in Fig. 2. Therefore, when the fasteners are in place and the shell rims secured by the two fasteners, the shell rim will be securely held in place and the lens will be held against rotary movement by the sleeve fitting into the seat 14.

In the form shown in Fig. 5, the sleeve 9 may be split longitudinally or may be placed about the rim 2 and crimped longitudinally to provide a tongue extension fitting into the groove 6. The stem 10 will be omitted in this form, and in place of a stem, a rivet 15 will be provided, the rivet having a split free end portion thus providing fingers 16 which will spread and clench the rivet in place, with the rivet extending through an opening formed in the shell rim 8 and into an opening formed in the sleeve 9 and registering with the opening of the shell rim.

In the form shown in Fig. 6, the sleeve will be formed as shown and previously described in connection with Figs. 2 and 5, and this sleeve will be provided with a threaded opening which will register with the opening 16' of the shell rim thus permitting a securing screw 17 to be passed through the opening 16' and screwed into the opening of the sleeve to securely but releasably hold the shell rim in place.

The form disclosed in Fig. 7 is somewhat different from that shown in the figures already described, and instead of providing a stem, rivets or securing screw, a wire 18 will be provided. This wire is passed through openings formed in the sleeve and has its end portions extending outwardly through registering openings formed in the shell rim. After being passed through openings in the shell rim, the end portions of the wire will be drawn together and twisted thus firmly holding the end portions of the shell rim in place. If desired, the end portions of the shell rim may be provided with grooves to receive the end portions of the wire 18.

In the form disclosed in Figs. 8 and 9, the sleeve is of the type crimped longitudinally to fit into the groove of the lens holding rim 2 and this sleeve is provided with a longitudinally extending rib 19 which fits into a longitudinally extending groove or seat 20 formed in the shell rim 8. This rib is provided with an opening at a point intermediate its length and a pin 21 passes through this opening and through registering openings formed in the shell rim, the side portions of the shell rim being cut to provide pockets 22 in which will be positioned heads formed by riveting the end portions of the pin 21.

In the form shown in Figs. 10 and 11, the structure is similar to the forms shown in Figs. 2, 3 and 4, in that the sleeve is provided with a stem 23 which extends through an opening formed in the shell rim but in this form, the stem 23 is split longitudinally thus providing arms 24 which will be bent about the shell rim transversely of the same and clamped into tight engagement with the shell rim. It will thus be seen that although the different forms disclosed are somewhat different in their operations, they all work upon the same principle, the sleeve holding the lens against rotary movement and the sleeve being connected with the shell rim to hold the shell rim in place.

In the form shown in Figs. 12 and 13, the fastener is formed from a blank having a rectangular body 25, having stems 26 extending from its ends. The body of the blank will be bent to form the sleeve 27 which will be similar to the sleeve 9 and the stems 26 will be brought together to form a pin 28 corresponding to the pin 10. This pin will be passed through the opening in the shell rim and a rivet head formed to hold the shell rim in place.

I claim:

1. A pair of eye-glasses including a lens holding rim, a non-metallic rim positioned about the lens holding rim, sleeves carried by the lens holding rim and passing through cutouts formed in a lens to hold the lens against rotation in the lens holding rim, and means connecting the sleeve with the non-metallic rim to hold the shell rim in place.

2. A pair of eye-glasses including a lens holding rim, a lens carried thereby, a non-metallic rim positioned about the lens holding rim, sleeves carried by the lens holding rim and received in cut-outs formed in the lens and non-metallic rim, and means connecting the sleeves with the non-metallic rim.

3. A pair of eye-glasses including a lens holding rim, a non-metallic rim positioned about the lens holding rim, sleeves positioned upon the lens holding rim, and a stem carried by each sleeve and extending through the non-metallic rim to hold the non-metallic rim in engagement with the sleeves.

4. A pair of eye glasses including a lens holding rim, a non-metallic rim positioned about the lens holding rim, sleeves positioned upon the lens holding rim and a stem extending from each sleeve through the non-metallic rim and provided with a head at its outer end engaging the non-metallic rim to hold the non-metallic rim in place.

5. A pair of eye-glasses including a lens holding rim, a non-metallic rim positioned about the lens holding rim, sleeves mounted upon the lens holding rim, and a stem extending from each sleeve, the stems extending through the non-metallic rim and having their outer end portions engaging the non-metallic rim and holding the non-metallic rim in place.

6. A pair of eye-glasses including a lens holding rim, a non-metallic rim about the lens holding rim, a sleeve carried by the lens holding rim, and a securing pin extending transversely through the non-metallic rim to connect the non-metallic rim with the sleeve and hold the non-metallic rim in place upon the lens rim.

7. A pair of eye-glasses including a lens holding rim having an internal groove to receive a lens, a non-metallic rim positioned about the lens holding rim, a sleeve positioned upon the lens holding rim and extending into the groove thereof, and means connecting the non-metallic rim with the sleeve.

8. A fastener of the character described comprising a strip bent to provide a tubular lens rim encircling sleeve, and stems extending from the ends of the strip and meeting to form a rivet pin extending from the sleeve for passing through an outer rim.

In testimony whereof I have hereunto set my hand.

CHARLES O. CARLSON.